Patented Sept. 26, 1939

2,174,498

UNITED STATES PATENT OFFICE 2,174,498

HYDROGENATION OF NITROPARAFFINS

Kenneth Johnson, Terre Haute, Ind., assignor to Purdue Research Foundation, La Fayette, Ind., a corporation of Indiana No Drawing. Application July 3, 1937,
Serial No. 151,841

7 Claims. (Cl. 260—583)

My invention relates to the production of amines. More specifically, my invention relates to the production of aliphatic amines by the hydrogenation of nitroparaffins.

The nitro non-benzenoid hydrocarbons may be obtained according to a number of different reactions but are most economically produced by vapor phase nitration of saturated hydrocarbons in accordance with the process of U. S. Patent 1,967,667 by H. B. Hass, E. B. Hodge and B. M. Vanderbilt. The nitroparaffins produced by this process from petroleum hydrocarbons constitute an advantageously cheap source of aliphatic compounds for the production of organic chemicals. I have now discovered an improved process for the direct hydrogenation of these nitrohydrocarbons to produce the corresponding amines.

The nitrohydrocarbons which are suitable for my process constitute the nitro non-benzenoid hydrocarbons such as the nitroparaffins, the nitro substituted cyclohexanes, the phenyl substituted nitroparaffins, or mixtures thereof. Among the nitroparaffins, nitroethane, 1-nitropropane, 2-nitropropane, 1-nitrobutane, 2-nitrobutane, 1-nitroisobutane and 2-nitroisobutane may, for example, be utilized. My invention is not to be limited to any particular nitrohydrocarbon of this series, however, but may be applied to any nitrohydrocarbon containing an aliphatic grouping with the nitro group attached thereto.

According to my process the nitro compounds are hydrogenated in the liquid phase in the presence of a catalyst and at temperatures below 165° C. The pressure and temperature relationships may be varied for the hydrogenation depending upon the particular nitro compound being hydrogenated and the catalyst that is used in the process. I have employed pressures from atmospheric to 2000 pounds per square inch. In general, higher pressures require less time for complete hydrogenation to occur. The reaction temperature should be maintained below 165° C., and preferably within the range 15° C.–150° C. High temperatures, in general, favor a more rapid hydrogenation, but I have found that at temperatures substantially above 165° C. there is a tendency for ammonia to be liberated from the reaction mixture and decomposition to occur. The hydrogenation reaction is exothermic and when high pressures are employed the heat of reaction will cause the temperature to rise to some extent, often 50 to 80° C. The time required for complete hydrogenation to occur in my process is a function of the temperature and pressure; that is, higher temperature and pressure will give rise to more rapid hydrogenation.

I have found, in general, that any suitable hydrogenation catalyst that is active below 165° C. may be used in my process. A number of such hydrogenation catalysts are described in The Hydrogenation of Organic Substances, 3rd edition, 1930, by Carleton Ellis. I prefer to use a finely divided nickel catalyst that is prepared in the following manner: A nickel-aluminum alloy is prepared in finely divided form. A suitable allow contains fifty percent aluminum and fifty percent nickel. The aluminum is dissolved out of the powdered alloy by strong alkali solution. The nickel residue is washed free from salts and bases with water and kept under liquid. This catalyst is active at temperatures around 25° C. and may be used repeatedly without losing its activity. However, I have found that numerous other catalysts are also satisfactory. Nickel, precipitated from nickel carbonate and supported on infusorial earth (Covert et al., Jour. Amer. Chem. Soc. 54, 1651 (1932)), or nickel-silica gel catalysts (Holmes and Anderson, Ind. & Eng. Chem. 17, 280 (1925)), may also be employed. These catalysts are most active at temperatures above about 85° C., however, and are less desirable for hydrogenations at the lower temperatures. Adkins copper chromite (Adkins and Conner, Jour. Amer. Chem. Soc. 53, 1091 (1931)), copper silica gel (Holmes and Anderson, loc. cit.), and nickel formate (Ellis, loc. cit. page 145) may also be used but the optimum temperature for the hydrogenation using these catalysts is generally above 125° C. and consequently the use of these catalysts is less advantageous because of this limitation. It is preferable, in general, to utilize catalysts that are active at lower temperatures because with certain catalysts there is a tendency for decomposition and liberation of ammonia to occur at elevated temperatures.

The hydrogenation may be effected without the use of any auxiliary solvent, but in general I prefer to dissolve the nitro compounds in a solvent such as anhydrous or aqueous methyl or ethyl alcohol before hydrogenation. Any suitable solvent or solvent mixture which is chemically inert toward the catalyst and the components of the reaction mixture at the temperature employed may be used in my process. The nature of the solvent which will secure optimum results will, of course, depend to some extent on the reaction conditions employed. Thus, I prefer to employ a more dilute aqueous alcohol for hydrogenation at atmospheric pressure than at increased pressures. For any combination of reaction conditions, preliminary experiments will readily demonstrate the optimum solvent composition.

In general, superatmospheric pressure hydrogenations may be carried out in the following manner: The nitro compound, with or without a solvent, and catalyst are introduced into a suitable pressure hydrogenation apparatus and sealed. Such an apparatus may be of the Adkins type which comprises a cylindrical steel reaction vessel fitted with a flexible tubing for the introduction of hydrogen gas under pressure. The apparatus is preferably kept in motion during the hydrogenation in order to insure thorough mixing of the nitro compound, the hydrogen and the catalyst. The reaction vessel may be wrapped with an electrical heating coil and cooling means may also be provided in order that the hydrogenation may be carried out at the desired temperature. After the hydrogenation is complete, the reaction mixture is removed from the apparatus and the resulting amine may be separated by any suitable method, such as distillation or crystallization of the acid salt.

The following specific examples are given in order to illustrate this procedure:

Example I

A mixture of 34 parts by weight of 1-nitro-2-methyl propane, 7.5 parts of nickel catalyst, prepared as described above, and 137 parts of 95% ethyl alcohol was introduced into and Adkins type hydrogenation apparatus. Hydrogen was then introduced and maintained at a pressure of 1000 to 1500 pounds per square inch for four hours with continued agitation. The temperature at the start of the reaction was about 25° C., but the heat of reaction raised this to between 40 and 50° C. Conversion of the nitro compound to 1-amino-2-methyl propane was 97%.

Example II

A mixture of 30 parts by weight of 1-nitropropane, 1.5 parts of nickel catalyst and 157 parts of 95% ethyl alcohol was introduced into the hydrogenation apparatus. Hydrogen was then introduced and the pressure was maintained at about 2000 pounds and the temperature at about 100° C. for four hours. Conversion to primary propylamine was 97%.

Example III

A mixture of 225 parts by weight of 2-nitrobutane and 7.5 parts of nickel catalyst were introduced into the hydrogenation apparatus. Hydrogen was then introduced and the pressure was maintained at about 600 pounds and the temperature at 25° C.–30° C. for six hours. Conversion to 2-aminobutane was 95%.

The following example is given in order to illustrate a method by which atmospheric pressure hydrogenations may be effected according to my invention:

Example IV

A tube was prepared with a sintered glass bottom through which hydrogen could be bubbled. Twenty-six parts by weight of 1-nitrobutane was dissolved in a mixture of 110 parts of ethyl alcohol and 260 parts of water. This amount was just sufficient to dissolve the nitro compound. The resulting solution was placed in the tube and 5 parts of nickel catalyst, prepared as described above, were added. Hydrogen was introduced through the sintered bottom of the glass tube at a rate to keep the catalyst in suspension for a period of forty-eight hours. Ninety percent of the nitro compound was converted to primary butyl amine.

The above examples are merely descriptions of procedures that are included within the scope of my invention and do not limit it in any manner. For example, my invention is not to be limited to the type of apparatus in which the hydrogenation may be carried out. Any type of equipment suitable for atmospheric or superatmospheric pressure hydrogenation may be employed. I may, for example, carry out my process in an apparatus that is designed for continuous rather than intermittent operation.

My invention is applicable to all hydrogenations carried out in the liquid phase below 165° C. The higher nitro compounds that are solid at ordinary temperatures may be hydrogenated at temperatures above their respective melting points or they may be dissolved or emulsified in suitable materials in order to be hydrogenated. Optimum conditions such as temperature, hydrogen pressure, solvent and catalyst may be determined experimentally for any particular nitro compound to be treated and any such variations are included within the scope of my invention.

What I claim is:

1. In a catalytic process for the direct hydrogenation of saturated non-benzenoid nitrohydrocarbons to the corresponding amines, the improvement which comprises contacting hydrogen and liquid nitrohydrocarbon with the catalyst at a temperature below 165° C.

2. In a catalytic process for the direct hydrogenation of nitroparaffins to the corresponding amines, the improvement which comprises contacting hydrogen and liquid nitroparaffin with the catalyst at a temperature from 15° C. to 150° C.

3. In a catalytic process for the direct hydrogenation of nitroparaffins to the corresponding amines, the improvement which comprises effecting the reaction in the liquid phase in the presence of an inert solvent for the nitroparaffin, at superatmospheric pressure, and at a temperature from 15° C. to 150° C., the pressure and temperature being such that the nitroparaffin is maintained in the liquid phase.

4. In a catalytic process for the direct hydrogenation of nitroparaffins to the corresponding amines, the improvement which comprises effecting the reaction in the liquid phase by refluxing the nitroparaffin in the presence of an inert solvent, while introducing hydrogen, at atmospheric pressure and at a temperature from 15° C. to 150° C.

5. In a catalytic process for the direct hydrogenation of nitroparaffins to the corresponding amines, the improvement which comprises contacting hydrogen and liquid nitroparaffin with a nickel hydrogenation catalyst at a temperature from 15° C. to 150° C.

6. In a catalytic process for the direct hydrogenation of nitropropane to the corresponding amine, the improvement which comprises contacting hydrogen and liquid nitropropane with a nickel hydrogenation catalyst at a temperature from 15° C. to 150° C.

7. In a catalytic process for the direct hydrogenation of nitrobutane to the corresponding amine, the improvement which comprises contacting hydrogen and liquid nitrobutane with a nickel hydrogenation catalyst at a temperature from 15° C. to 150° C.

KENNETH JOHNSON.